(12) United States Patent
Ando (10) Patent No.: US 11,064,120 B2
(45) Date of Patent: Jul. 13, 2021

(54) IMAGING-ELEMENT INCLINATION ADJUSTMENT MECHANISM, METHOD FOR ADJUSTING INCLINATION OF IMAGING ELEMENT, AND IMAGING APPARATUS

(71) Applicant: Takashi Ando, Tokyo (JP)

(72) Inventor: Takashi Ando, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/736,940

(22) Filed: Jan. 8, 2020

(65) Prior Publication Data
US 2020/0275027 A1    Aug. 27, 2020

(30) Foreign Application Priority Data

Feb. 21, 2019   (JP) ............................ JP2019-029775

(51) Int. Cl.
*H04N 5/232* (2006.01)
*H04N 5/225* (2006.01)
*G03B 5/00* (2021.01)

(52) U.S. Cl.
CPC ........... *H04N 5/23287* (2013.01); *G03B 5/00* (2013.01); *H04N 5/2253* (2013.01); *H04N 5/2254* (2013.01); *G03B 2205/0015* (2013.01)

(58) Field of Classification Search
CPC ............. H04N 5/23287; H04N 5/2253; H04N 5/2254; G03B 5/00; G03B 2205/0015
See application file for complete search history.

(56) References Cited

U.S. PATENT DOCUMENTS

| | | | |
|---|---|---|---|
| 2006/0133786 A1* | 6/2006 | Teramoto | H04N 5/23248 396/55 |
| 2011/0181743 A1 | 7/2011 | Ando | |
| 2012/0038784 A1 | 2/2012 | Irisawa et al. | |
| 2013/0222664 A1 | 8/2013 | Takahashi et al. | |
| 2014/0104482 A1 | 4/2014 | Muramatsu et al. | |

FOREIGN PATENT DOCUMENTS

| | | |
|---|---|---|
| JP | 2002-247442 | 8/2002 |
| JP | 2012-151595 | 8/2012 |
| JP | 2012151595 A * | 8/2012 |

* cited by examiner

*Primary Examiner* — Ahmed A Berhan
(74) *Attorney, Agent, or Firm* — Oblon, McClelland, Maier & Neustadt, L.L.P.

(57) ABSTRACT

An imaging-element inclination adjustment mechanism including at least one adjustment member attached to an imaging-element unit in a manner that a position of the adjustment member is adjustable relative to the imaging-element unit, the imaging-element unit holding an imaging element; at least one support member secured to a housing; and at least one securing member engaged with the adjustment member and attached to the support member. The position of the adjustment member is adjusted relative to the imaging-element unit to adjust a position of the imaging-element unit relative to the support member. The support member supports the imaging-element unit via the adjustment member at each of at least three positions.

12 Claims, 6 Drawing Sheets

IMAGING-ELEMENT INCLINATION ADJUSTMENT MECHANISM, METHOD FOR ADJUSTING INCLINATION OF IMAGING ELEMENT, AND IMAGING APPARATUS

CROSS-REFERENCE TO RELATED APPLICATIONS

This patent application is based on and claims priority pursuant to 35 U.S.C. § 119(a) to Japanese Patent Application No. 2019-029775, filed on Feb. 21, 2019, in the Japan Patent Office, the entire disclosure of which is hereby incorporated by reference herein.

BACKGROUND

Technical Field

The present disclosure relates to an imaging-element inclination adjustment mechanism, a method for adjusting the inclination of an imaging element, and an imaging apparatus.

Related Art

Reduction in size and an increase in image quality are demanded of imaging apparatuses such as digital cameras. In particular, with a digital camera incorporating an imaging element with a high density of pixels, the number of which is markedly increasing in recent years, it is required to precisely adjust the position and inclination of the imaging element with respect to an imaging optical system.

SUMMARY

In one aspect of this disclosure, there is provided an improved imaging-element inclination adjustment mechanism including at least one adjustment member attached to an imaging-element unit in a manner that a position of the adjustment member is adjustable relative to the imaging-element unit, the imaging-element unit holding an imaging element; at least one support member secured to a housing; and at least one securing member engaged with the adjustment member and attached to the support member. The position of the adjustment member is adjusted relative to the imaging-element unit to adjust a position of the imaging-element unit relative to the support member. The support member supports the imaging-element unit via the adjustment member at each of at least three positions.

In another aspect of this disclosure, there is provided an improved

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Figure 1:
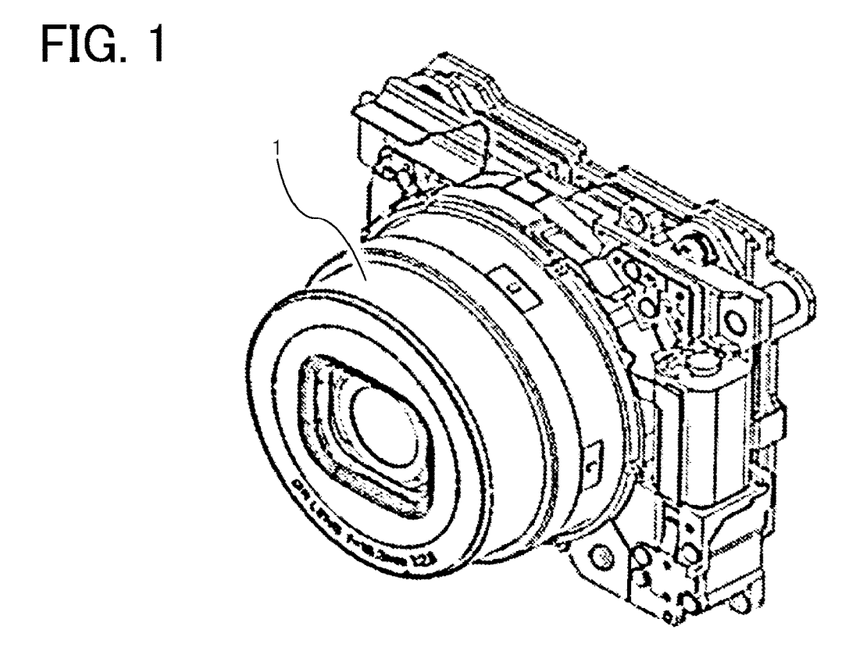
FIG. 1 is a front perspective view of an imaging optical device that is installed in an imaging apparatus according to an embodiment of the disclosure.
Figure 2:
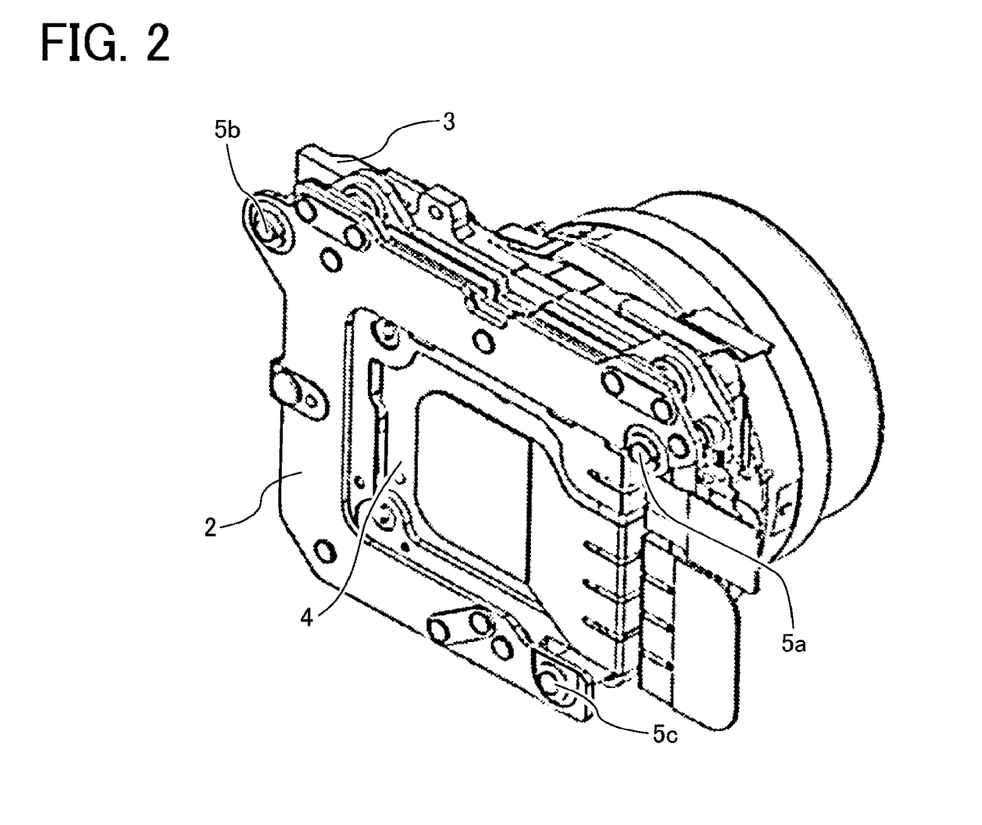
FIG. 2 is a rear perspective view of the imaging optical device in FIG. 1.

An embodiment of the present disclosure is described below in detail referring to the drawings. FIG. 1 is a front perspective view of an imaging optical device that is installed in an imaging apparatus according to an embodiment of the disclosure. FIG. 2 is a rear perspective view of the imaging optical device.

The imaging optical device of the imaging apparatus according to the embodiment includes a lens barrel 1 that holds lenses of an imaging optical system. The lens barrel 1 is held by a base member 3. An imaging element 4 is held at an imaging-element unit, for example, at a substantially center position of a motion blur correction unit 2. The motion blur correction unit 2 is held by the base member 3, for example, via three position adjustment mechanisms 5a, 5*b*, and 5*c*. The base member 3 is integrally assembled with a housing of the lens barrel 1.

Figure 3:
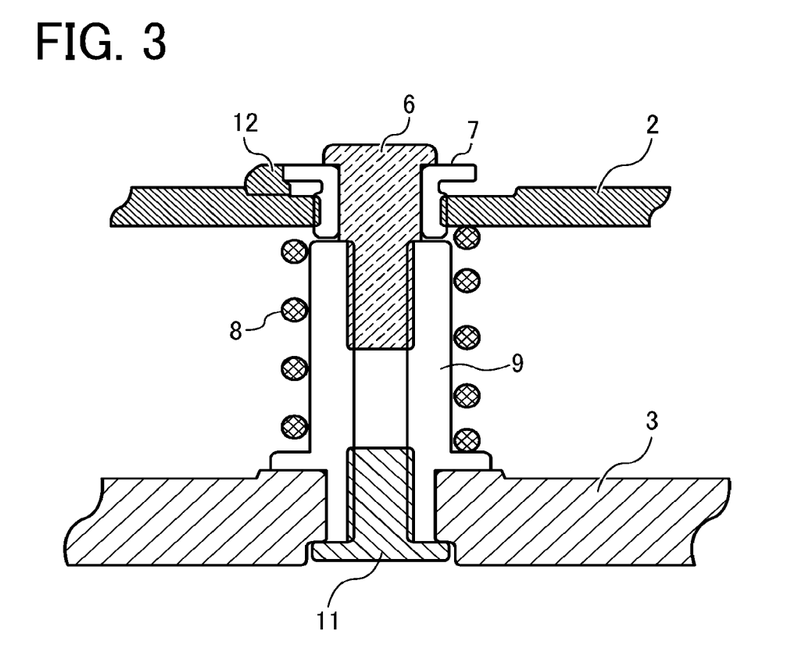
FIG. 3 is a sectional view of a position adjustment mechanism according to the embodiment.
Figure 4:
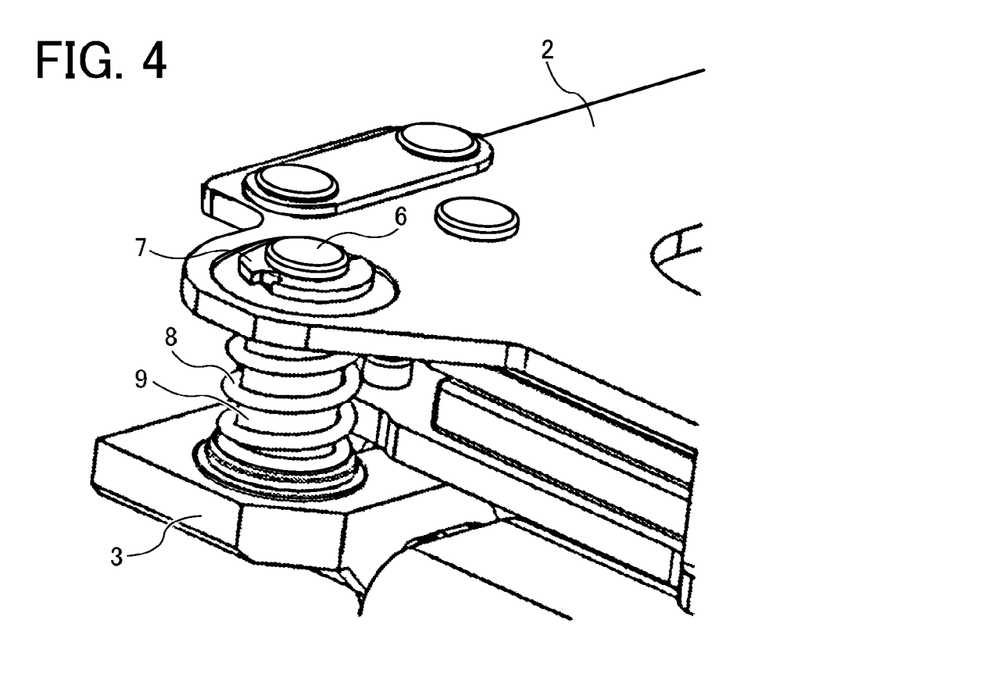
FIG. 4 is a perspective view of the position adjustment mechanism in FIG. 3.
Figure 5:
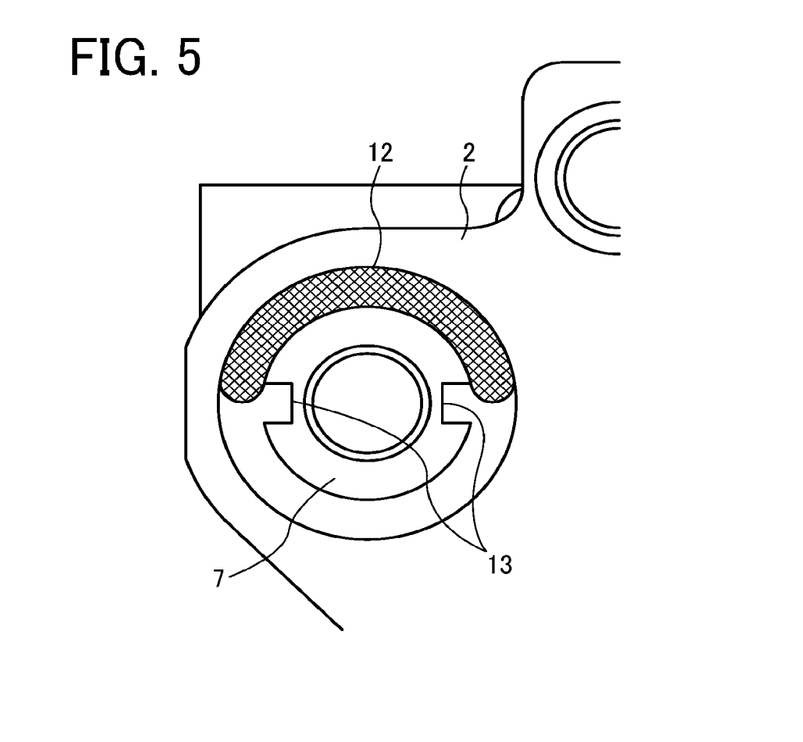
FIG. 5 is a plan view of the position adjustment mechanism in FIG. 3.

The configuration of an imaging-element inclination adjustment mechanism according to the embodiment is described referring to FIGS. 3 to 5. The imaging-element inclination adjustment mechanism according to the embodiment includes the above-described three position adjustment mechanisms 5*a*, 5*b*, and 5*c*. The imaging-element inclination adjustment mechanism adjusts the position of the motion blur correction unit 2 relative to the base member 3 at each of the three position adjustment mechanisms 5*a*, 5*b*, and 5*c* to adjust the inclination of the imaging element 4 with respect to the optical axis of the imaging optical system. That is, the position adjustment mechanisms 5*a*, 5*b*, and 5*c* can individually adjust the distances between the motion blue correction unit 2 and the base member 3 (described later). The distances at the three points are adjusted to correct the inclination of an imaging surface of the imaging element 4 with respect to the optical axis (the inclination is in other words a deviation of a direction normal to the imaging surface from the optical axis). The position adjustment mechanisms 5*a*, 5*b*, and 5*c* have the same structure. In the following description, one of the position adjustment mechanisms 5*a*, 5*b*, and 5*c* is selected as a representative example and the configuration thereof is described.

FIG. 3 is a sectional view of the representative example of the position adjustment mechanisms 5*a*, 5*b*, and 5*c* according to the embodiment. FIG. 4 is a perspective view of the representative example of the position adjustment mechanisms 5*a*, 5*b*, and 5*c*. The position adjustment mechanisms 5*a*, 5*b*, and 5*c* each include an adjustment member 7 that is attached to the motion blur correction unit 2, a support member 9 that is secured to the base member 3 that is combined as a single unit with the housing, and a securing member 6 that attaches the adjustment member 7 to the support member 9. In the embodiment, the adjustment member 7 is a screw member having threads in the outer periphery thereof. The adjustment member 7 is screwed into corresponding one of three screw holes provided in the motion blur correction unit 2. The screw hole extends through the plate-shaped motion blur correction unit 2. The adjustment member 7 is inserted through the screw hole from the side opposite to the base member 3. Adjusting the rotation amount of the adjustment member 7 can adjust the protrusion amount of a distal end portion of the adjustment member 7 from the motion blur correction unit 2 toward the base member 3. The adjustment member 7 has a flange that is provided at a head portion (on the side opposite to the distal end portion) of the adjustment member 7. The adjustment member 7 may be rotated, for example, by applying a tool such as a pin wrench to a pair of notches 13. The notches 13 are provided to face each other in the outer peripheral edge of the flange.

The adjustment member 7 has a hole at the center through which the securing member 6 is inserted. The securing member 6 has a shaft portion provided on the head side. The shaft portion is rotatably fitted into the hole of the adjustment member 7. The securing member 6 also has a screw portion provided on the distal end side with respect to the shaft portion. The screw portion has a smaller diameter than the shaft portion. The shaft portion of the securing member 6 has a longer axial length than the hole of the adjustment member 7. The screw portion at the distal end is screwed into a screw hole provided at the center of the support member 9. When the shaft portion of the securing member 6 inserted through the adjustment member 7 is screwed to the support member 9, the adjustment member 7 is held between a head portion of the securing member 6 and a distal end portion of the support member 9 with a certain backlash in the axial direction.

In the embodiment, the support member 9 is a shaft member having the screw hole at the center thereof. A proximal end portion (on the side opposite to the distal end portion to which the securing member 6 is screwed) is secured to the base member 3 by a fastening screw 11. That is, the motion blur correction unit 2 according to the embodiment is held by the base member 3 via the three position adjustment mechanisms 5*a*, 5*b*, and 5*c* each including the adjustment member 7, the securing member 6, and the support member 9. The position of the adjustment member 7 in the axial direction is adjustable relative to the motion blur correction unit 2 in accordance with the rotation amount of the adjustment member 7. Adjusting the rotation amount of the adjustment member 7 can adjust the distance between the motion blur correction unit 2 and the base member 3 at each of the position adjustment mechanisms 5*a*, 5*b*, and 5*c*. Changing the combination of the distances between the motion blur correction unit 2 and the base member 3, the distances which are adjusted by the position adjustment mechanisms 5*a*, 5*b*, and 5*c*, can change the inclination of the motion blur correction unit 2 with respect to the base member 3 secured to the lens barrel 1 including the imaging optical system. Thus, the inclination of the imaging surface of the imaging element 4 is adjustable with respect to the optical axis of the imaging optical system, and the direction normal to the imaging surface can be aligned with the optical axis. In the embodiment, the three position adjustment mechanisms 5*a*, 5*b*, and 5*c* are disposed to surround the imaging element 4, thereby easily adjusting the inclination of the imaging element with high precision.

Since the shaft portion of the securing member 6 is longer than the hole of the adjustment member 7, and the adjustment member 7 is screwed into the screw hole of the motion blur correction unit 2 and has a screw tolerance, a backlash exists in the axial direction at each of the position adjustment mechanisms 5*a*, 5*b*, and 5*c*. Thus, the inclination of the imaging surface may vary due to the posture of the imaging apparatus and a vibration or the like that is applied to the imaging apparatus. In the embodiment, to avoid such a variation, an urging member 8 is provided at each of the position adjustment mechanisms 5*a*, 5*b*, and 5*c*. The urging member 8 urges the motion blur correction unit 2 in the screw-axis direction. In the embodiment, the urging member 8 is a coil spring, provided between the motion blur correction unit 2 and the base member 3, and disposed around the support member 9 in a compressed state. That is, in the embodiment, the urging member 8 urges the motion blur correction unit 2 in a direction away from the base member 3. Accordingly, the backlash due to the screw tolerance is continually accommodated by the urging force of the urging member 8.

An inclination adjustment work includes capturing an image of a predetermined chart through the imaging optical system of the lens barrel 1 by the imaging element 4 attached to the base member 3 of the lens barrel 1 via the imaging-element inclination adjustment mechanism including the three position adjustment mechanisms 5*a*, 5*b*, and 5*c*; and detecting the inclination of the imaging element 4 with respect to the imaging optical system based on the distortion of the image. The correction amount at each of the position adjustment mechanism 5*a*, 5*b*, and 5*c*, that is, the rotation direction and rotation amount of each adjustment member 7 are calculated based on the detected inclination of the imaging element 4. Each adjustment member 7 is adjusted in accordance with the calculated correction amount by applying a tool such as a pin wrench to the notches 13 provided in the flange of the adjustment member 7. When the adjustment is ended, as illustrated in the sectional view in FIG. 3 and a plan view in FIG. 5, a portion of the flange of the adjustment member 7 is secured to the motion blur correction unit 2 using an adhesive 12 or the like to restrict the rotation of the adjustment member 7. Accordingly, the inclination adjustment result of the imaging element 4 is prevented from being unintentionally changed due to looseness of the screw or the like. The state with the inclination of the imaging element adjusted is maintained.

If it is required to remove the motion blur correction unit 2 from the base member 3 secured to the housing of the optical system for a certain reason such as an overhaul after the inclination of the imaging element 4 is adjusted, the securing member 6 is removed from the support member 9 and hence the motion blur correction unit 2 can be removed from the housing. At this time, the adjusted position of the adjustment member 7 secured to the motion blur correction unit 2 using the adhesive is held. When the motion blur correction unit 2 is assembled, the securing member 6 is secured to the support member 9 again and hence the motion blur correction unit 2 can be secured to the base member 3 while the adjusted position of the adjustment member 7 at each position adjustment mechanism is maintained. The state with the inclination of the imaging element 4 corrected is immediately attained, and the inclination adjustment process does not have to be performed again.

As described above, according to the embodiment, the imaging-element unit is attachable to and detachable from the housing while the inclination of the imaging element is held adjusted. Since the man hours for disassembly/assembly are reduced, the cost can be reduced. In addition, since the adjustment member has the flange, the position adjustment mechanism for adjusting the inclination can be further reduced in size in the axial direction.

Figure 6:
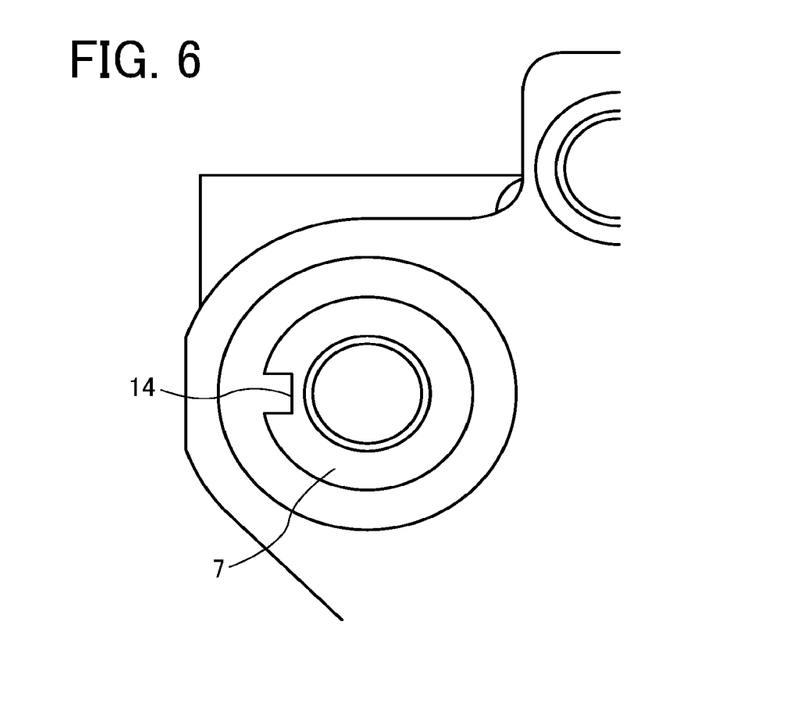
FIG. 6 is a plan view of a modification of the embodiment, in which two notches are provided in a flange of an adjustment member.
Figure 7:
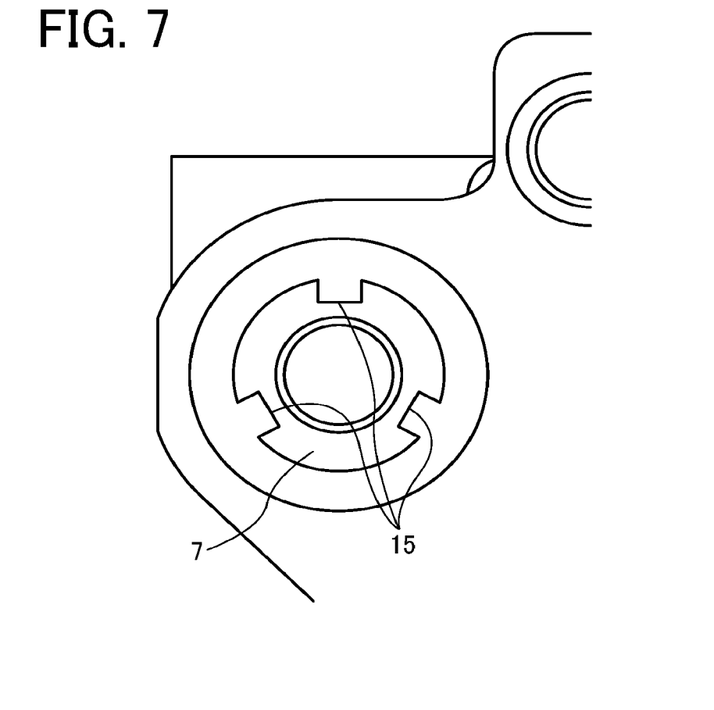
FIG. 7 is a plan view of a modification of the embodiment, in which three notches are provided in the flange of the adjustment member.

FIGS. 6 and 7 are plan views of modifications of the embodiment, each view illustrating at least one notch provided in the flange of the adjustment member 7. FIG. 6 illustrates a notch 14 provided at one position of the flange. FIG. 7 illustrates notches 15 provided at three positions of the flange. Each notch provided in the flange allows a tool and the flange to engage with each other and to allow the tool to rotate the adjustment member 7. The number of notches may be one, or three or more. When a large force is not required for rotating the adjustment member 7, the number of notches is decreased to decrease the man hours for processing the adjustment member 7 and to reduce the cost. In contrast, when the motion blur correction unit 2 has a large weight such as when the imaging element 4 is increased in size, the urging force of the urging member 8 is required to be set high, and hence the torque for rotating the adjustment member 7 increases. Thus, when the torque is large, the number of notches of the adjustment member 7 is increased to distribute the force that is exerted on a fitting portion of the tool used for the adjustment and hence to prevent breakage of the tool.

Figure 8:
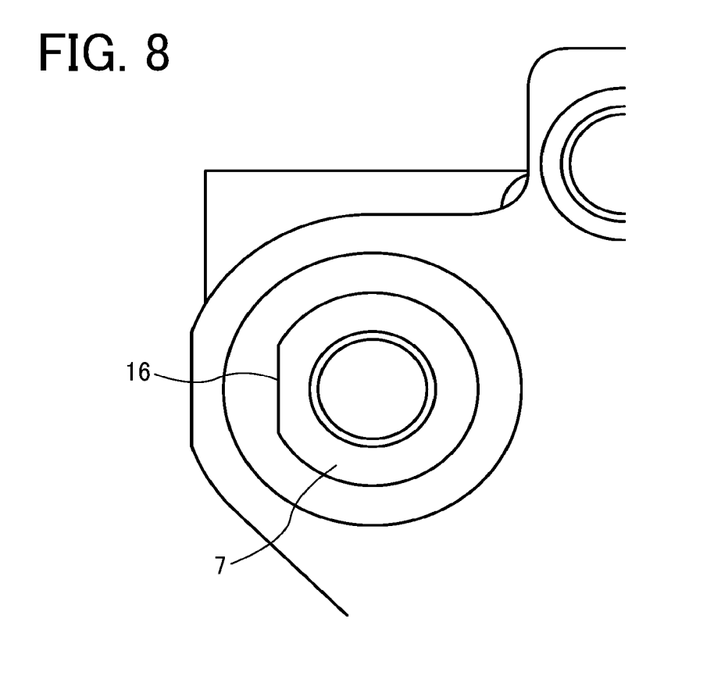
FIG. 8 is a plan view of a modification of the embodiment, in which one D-shaped cut portion is provided in the flange of the adjustment member.
Figure 9:
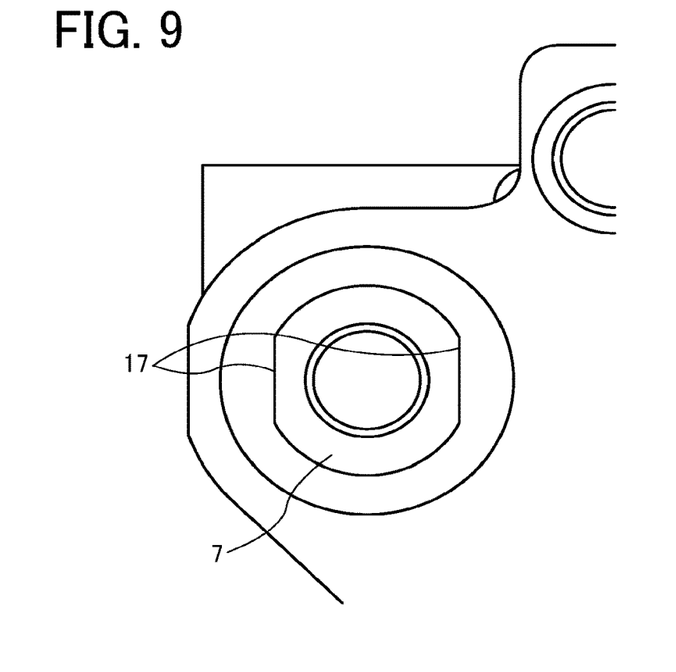
FIG. 9 is a plan view of a modification of the embodiment, in which two D-shaped cut portions are provided in the flange of the adjustment member.

FIGS. 8 and 9 are plan views of other modifications each of which employs a configuration other than the notch at the flange of the adjustment member 7 for the rotation of the adjustment member 7 using a tool. Referring to FIGS. 8 and 9, the flange portions each have at least one D-shaped cut portion. FIG. 8 illustrates one D-shaped cut portion 16 formed in the flange. FIG. 9 illustrates two D-shaped cut portions 17 formed in the flange. Each D-shaped cut portion has a role similar to the role of the notch. The advantageous effect varies depending on the difference in the number of D-shaped cut portions provided in the flange in a way similar to the variation of the advantageous effect depending on the difference in the number of notches provided in the flange.

Figure 10:
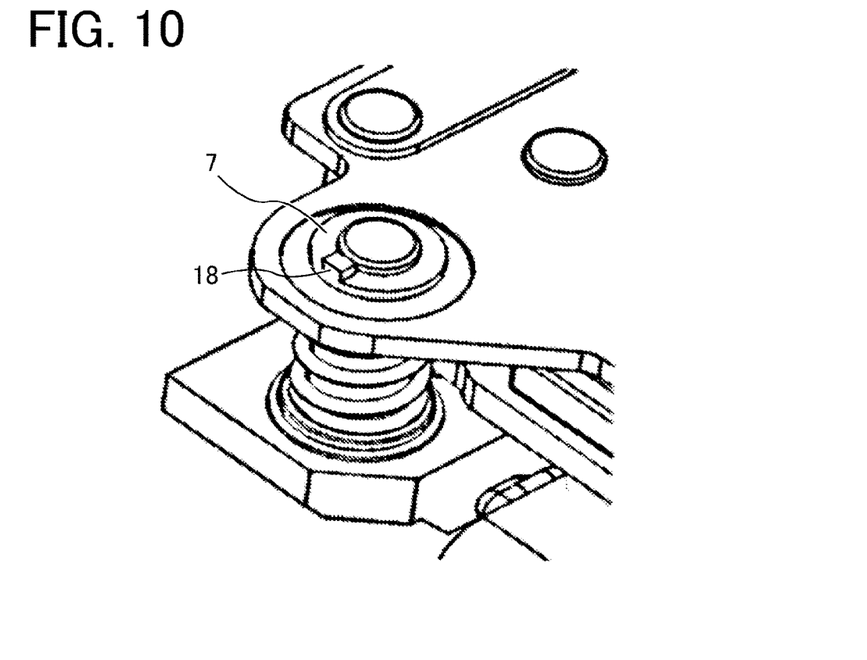
FIG. 10 is a plan view of a modification of the embodiment, in which one protrusion is provided at the flange of the adjustment member.

FIG. 10 is a perspective view of a modification in which a protrusion 18 that is fitted to a tool is provided at at least one position of the flange of the adjustment member 7, instead of the notch or the D-shaped cut portion. When the inclination of the imaging surface is adjusted, the rotation amount of the adjustment member 7 is determined based on variations in the dimensions of associated parts and precision of assembly. Thus, the position of the protrusion 18 that is fitted to the tool is not uniquely determined. When the outer peripheral portion of the adjustment member 7 is secured to the motion blur correction unit 2 by bonding after the inclination is adjusted, with the configuration of the modification, the flange has no lack portion in the peripheral edge portion thereof, and has the same diameter over the entire circumference. Thus, the bonding range of the bonding portion does not vary depending on the rotation amount of the screw of the adjustment member 7, and the bonding work is more stably performed.

Figure 11:
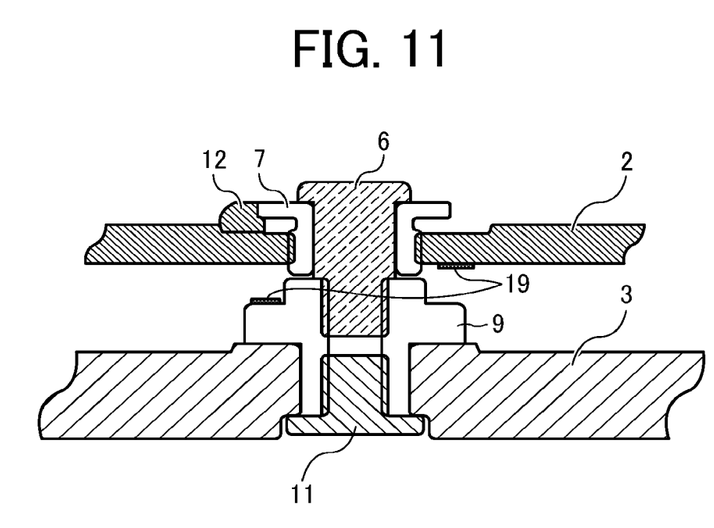
FIG. 11 is a sectional view of a modification of the embodiment, in which a wave-shaped washer is employed as an urging member of the position adjustment mechanism.
Figure 12:
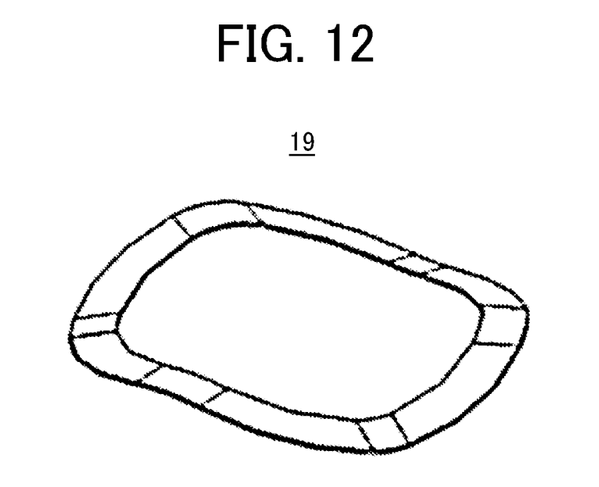
FIG. 12 is a perspective view of the wave-shaped washer in FIG. 11.

FIG. 11 is a sectional view of a modification, in which a wave-shaped washer 19 is employed as the urging member 8 of the position adjustment mechanism according to the embodiment. FIG. 12 is a perspective view of the wave-shaped washer 19. The urging member 8 uses the coil spring according to the embodiment illustrated in FIGS. 3, 4, and other figures. In contrast, according to the modification illustrated in FIG. 11, the wave-shaped washer 19 is disposed between the motion blur correction unit 2 and the base member 3 to surround the support member 9 in a compressed state. One vertex of the wave shape is in pressure contact with the motion blur correction unit 2, and another vertex is in pressure contact with the base member 3. Since the wave-shaped washer is used instead of the coil spring, the space in the optical-axis direction of the position adjustment mechanism can be further reduced.

The adjustment member may use a hexagon socket head screw; however, with any one of the adjustment members according to the embodiment and the modifications each having the at least one notch, the at least one D-shaped cut portion, or the at least one protrusion provided at the flange, the thickness of the adjustment member in the axial direction can be thinner than the head portion of the hexagon socket head screw, and the space efficiency of each position adjustment mechanism can be further increased.

In this embodiment, the adjustment member and the securing member are the screw members. However, no limitation is intended thereby as far as the adjustment member can adjust the position thereof relative to the imaging-element unit in the axial direction of the position adjustment mechanism (substantially corresponding to the direction normal to the imaging surface) and the securing member can secure the adjustment member to the support member. Moreover, in this embodiment, the adjustment member is secured to the imaging-element unit using the adhesive. However, the securing method is not limited to using the adhesive and any method may be employed as far as the adjusted position of the adjustment member relative to the imaging-element unit can be secured.

In the embodiment, the urging member is disposed between the imaging-element unit (the motion blur correction unit) and the base member in a compressed state to accommodate the backlash of the position adjustment mechanism in the axial direction, and the imaging-element unit is urged in the direction away from the base member. However, for example, an urging member that is engaged with the housing may be in pressure contact with a surface of the imaging-element unit on the side opposite to the base member to urge the imaging-element unit toward the base member, thereby accommodating the backlash of the position adjustment mechanism in the axial direction.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An imaging-element inclination adjustment mechanism, comprising:
　an adjustment member attached to an imaging-element unit in a manner that a position of the adjustment member is adjustable relative to the imaging-element unit, the imaging-element unit holding an imaging element, wherein the adjustment member is a screw member penetrating through the imaging-element unit and screwed to the imaging-element unit;
　a support member secured to a housing; and
　a securing member engaged with the adjustment member and attached to the support member,
　wherein the position of the adjustment member is adjusted relative to the imaging-element unit to adjust a position of the imaging-element unit relative to the support member, and
　wherein the support member supports the imaging-element unit via the adjustment member at each of at least three positions.

2. The imaging-element inclination adjustment mechanism according to claim 1,
　wherein the securing member has a screw portion rotatably inserted through the adjustment member and screwed to the support member, and
　wherein the adjustment member is held between the support member and a head portion of the securing member screwed to the support member.

3. The imaging-element inclination adjustment mechanism according to claim 2, wherein the adjustment member has a flange, and the flange has at least one notch.

4. The imaging-element inclination adjustment mechanism according to claim 2, wherein the adjustment member has a flange, and the flange has at least one D-shaped cut portion.

5. The imaging-element inclination adjustment mechanism according to claim 2, wherein the adjustment member has a flange, and the flange has at least one protrusion.

6. The imaging-element inclination adjustment mechanism according to claim 1, further comprising:
　an urging member configured to urge the imaging-element unit and the housing in one of a direction away from each other and a direction toward each other.

7. The imaging-element inclination adjustment mechanism according to claim 6, wherein the urging member is a compression coil spring.

8. The imaging-element inclination adjustment mechanism according to claim 6, wherein the urging member is a wave washer.

9. An imaging apparatus comprising:
　the imaging-element inclination adjustment mechanism according to claim 1.

10. The imaging apparatus according to claim 9,
　wherein the housing is combined with a lens barrel of an imaging optical system as a single unit, configured to form an object image on the imaging element.

11. The imaging-element inclination adjustment mechanism of claim 1, wherein the adjustment member directly contacts a head portion of the securing member.

12. A method for adjusting an inclination of an imaging element, the method comprising:
　attaching an adjustment member to an imaging-element unit in a manner that a position of the adjustment member is adjustable relative to the imaging-element unit, the imaging-element unit holding an imaging element, wherein the adjustment member is a screw member penetrating through the imaging-element unit and screwed to the imaging-element unit;
　securing a support member to a housing;
　engaging a securing member with the adjustment member and attaching the securing member to the support member;
　adjusting the position of the adjustment member relative to the imaging-element unit to adjust a position of the imaging-element unit relative to the support member; and
　supporting the imaging-element unit by the support member via the adjustment member at each of at least three positions.

* * * * *